United States Patent [19]
Kern, Jr.

[11] Patent Number: 6,020,033
[45] Date of Patent: Feb. 1, 2000

[54] METHOD OF MAKING POLYFLUOROORGANO COMPOSITES

[75] Inventor: Frederick William Kern, Jr., Colchester, Vt.

[73] Assignee: International Business Machines Corporation, Armonk, N.Y.

[21] Appl. No.: 08/791,080

[22] Filed: Jan. 29, 1997

Related U.S. Application Data

[62] Division of application No. 08/512,582, Aug. 8, 1995, Pat. No. 5,899,238.

[51] Int. Cl.$^7$ .............................. B32B 1/08; B32B 27/08; B32B 27/28; B32B 31/00
[52] U.S. Cl. .................. 427/412.4; 427/402; 427/407.1; 428/36.6; 428/39.91; 428/421; 428/422; 428/518; 428/520; 428/522; 138/141; 138/145; 138/146; 138/DIG. 3
[58] Field of Search .................................. 428/36.6, 36.7, 428/36.9, 36.91, 421, 422, 518, 522, 520; 427/412.4, 402, 407.1; 138/177, DIG. 3, 140, 141, 145, 146

[56] References Cited

U.S. PATENT DOCUMENTS

| | | | |
|---|---|---|---|
| 4,677,017 | 6/1987 | Deantonis et al. | 428/214 |
| 5,139,878 | 8/1992 | Kim et al. | 428/421 |
| 5,409,997 | 4/1995 | Murphy | 525/274 |
| 5,527,858 | 6/1996 | Blong et al. | 525/187 |
| 5,718,957 | 2/1998 | Yokoe et al. | 428/36.91 |

OTHER PUBLICATIONS

Schmitz, Peter et al., "Films." Ullman's Encyclopedia of Industrial Chemistry, 5th Ed., vol. A11, pp. 85–86, 102–104, Jan. 1988.

*Primary Examiner*—Vivian Chen
*Attorney, Agent, or Firm*—Heslin & Rothenberg, P.C.

[57] ABSTRACT

A method for reducing the corrosive chemical vapor permeability of a polyfluoroorgano resin substrate which comprises coating its outer surface with a vinylidene dichloride copolymer. The method produces a polyfluoroorgano resin substrate-vinylidene dichloride copolymer composite, for example a TEFLON-perfluoralkyl vinylether copolymer pipe having its surface immediate to the environment treated with a vinylidene dichloride/vinyl chloride copolymer.

9 Claims, No Drawings

METHOD OF MAKING POLYFLUOROORGANO COMPOSITES

This application is a divisional of application Ser. No. 08/512,582, filed Aug. 8, 1995, now U.S. Pat. No. 5,899,238.

FIELD OF THE INVENTION

The present invention relates to polyfluoroorgano—vinylidene dichloride copolymer composites, methods for making them, and objects fabricated from them.

BACKGROUND OF THE INVENTION

As used hereinafter, the expression "polyfluoroorgano substrate" means a Teflon™ resin, which includes Teflon PFA (perfluoroalkoxy) resin, a copolymer of tetrafluoroethylene and perfluoroalkyl vinylether, Teflon FEP, a copolymer of tetrafluoroethylene and hexafluoropropylene, and Teflon PTFE (polytetrafluoroethylene). These materials are manufactured by E. I. Dupont De Nemours and Co. and are often used as barrier resins. The compositions include thermoplastics and are also used in the electronics industry and the pharmaceutical industry because they have outstanding chemical resistance. Experience has shown, however, that while in most instances, a Teflon resin substrate can serve as an excellent barrier material, permeation of toxic materials in the gas phase can occur through the bulk of the substrate when it is in contact with a liquid containing chemicals having a high vapor pressure. The problem becomes particularly acute when the noxious liquid is at a high temperature.

It would be desirable therefore to provide a Teflon resin substrate which would be suitable for handling a vapor-generating, corrosive medium while substantially precluding the passage of such chemical vapors through the bulk material of the Teflon resin substrate to the external environment.

SUMMARY OF THE INVENTION

The present invention relates to polyfluoroorgano composites, such as a Teflon PFA™ or Teflon TFE™ composite, and method for reducing their vapor permeability. The present invention more particularly relates to a method of decreasing the permeability of a polyfluoroorgano substrate, such as a pipe, tube, or fitting, to chemical vapors, by employing a vinylidene dichloride copolymer, such as dichloride/vinylchloride copolymer applied to the surface of the polyfluoroorgano substrate immediate to the external environment.

As used hereinafter, the expression "Saran B" means vinylidene dichloride/vinyl chloride copolymer, which is a copolymer manufactured by the Dow Chemical Co. However, additional vinylidene dichloride copolymers such as those with alkyl acrylates and acrylonitrile are available.

The present invention is based on the discovery that application of a vinylidene dichloride/vinyl chloride copolymer to the external surface of a Teflon resin substrate (i.e. the surface of the substrate that is immediate to the external environment) has been found to effect a substantial reduction in the chemical vapor permeability of the substrate.

There is provided by the present invention, a method for reducing the permeability of a polyfluoroorgano resin substrate to chemical vapors whereby the release of such chemical vapors to the external environment is minimized, which method comprises applying to, or treating the surface of the polyfluoroorgano resin substrate which is immediate to the external environment with a vinylidene dichloride copolymer to produce a polyfluoroorgano resin substrate-vinylidene dichloride copolymer composite.

In another aspect of the present invention, there is provided a polyfluoroorgano resin substrate-vinylidene dichloride copolymer composite. In particular, the invention provides a double-walled, corrosion-resistant pipe comprising: (a) an inner tube of polyfluoroorgano resin; and (b) an outer tube of a vinylidene dichloride copolymer. In one embodiment the inner tube is a copolymer of tetrafluoroethylene and perfluoroalkyl vinylether and the outer tube is a vinylidene dichloride/vinyl chloride copolymer. Depending upon how it is applied, the outer tube may be comprised of a plurality of layers of vinylidene dichloride/vinyl chloride copolymer film, or it may be a single layer. Commonly the outer tube will have a thickness from 10% to 100% of the thickness of the inner tube.

DETAILED DESCRIPTION

As used herein, the term "composite" or "composite structure" means that a secure or integral contact is present or has been achieved between the surface of the Teflon resin substrate and the vinylidene dichloride/vinyl chloride copolymer. For the purposes of the present invention, the composite will be fabricated such that the vinylidene dichloride/vinyl chloride copolymer is situated on the surface of the Teflon substrate that is not in contact with the corrosive fluid in its liquid state. The surface of the Teflon substrate that is not in contact with the corrosive fluid in its liquid state will be referred to as the "exterior" surface or "external" surface.

For example, a vinylidene dichloride/vinyl chloride copolymer film can be wrapped onto the exterior surface of a Teflon resin pipe. Alternatively, Teflon resin and vinylidene dichloride/vinyl chloride copolymer can be coextruded to produce a composite structure. For example, coextrusion can be effected on a mandrel to produce a pipe having an inner Teflon resin core and an outer integral vinylidene dichloride/vinyl chloride copolymer layer having a thickness of from 125 $\mu$m to 500 $\mu$m. In addition, a solution of the vinylidene dichloride/vinyl chloride copolymer in a suitable solvent such as tetrahydrofuran, 1,4-dioxane, or chlorobenzene can be applied to the polyfluoroorgano resin substrate by dipping, spraying or painting.

In order that those skilled in the art will be better able to practice the present invention, the following examples are given by way of illustration and not by way of limitation. All parts are by weight unless otherwise indicated.

EXAMPLE 1

A 400 mm length of Teflon PFA tubing having an OD of 13 mm and an ID of 9.5 mm was prepared. Both ends were sealed with a Galtek Flaretek™ union (P/N SU8FN-1) and cap (P/N FLC8). The tube was placed upright, the top fitting removed, and the assembly filled with water, then sealed by replacing the top fitting to confirm that it was water tight. The tube was then emptied and allowed to dry. A test cell was constructed in the form of a box, fabricated from 3 mm polymethymethacrylate (acrylic) sheet stock, having dimensions of 25 mm×50 mm×75 mm. Two 13 mm diameter holes were drilled in each side, concentric with the major axis of the box and small hole was drilled and tapped to accommodate a 6-32 screw in one side of the box. The Teflon PFA tube was inserted through the 13 mm holes and the tube was filled with a solution of 30% aqueous ammonia. One drop of 36.5% HCl was placed in the test cell through the small hole, and the screw was replaced.

The above test was repeated with the exception of the holes in the test cell being increased from 13 mm in diameter to 14 mm. Five thicknesses of Saran wrap B were thoroughly wrapped around the Teflon PFA tube to form a composite structure. The cell was then assembled by placing the wrapped tube through the enlarged holes and the complete cell was filled with the chemicals as described above, for 60 days. At the end of the test period, the tubes were visually examined. The control (unwrapped) tube had a visible coating of ammonium chloride on its surface. The composite tube was found to be free of ammonium chloride. This shows that the composite structure is less permeable to $NH_3$ vapors than the Teflon PFA tube.

EXAMPLE 2

The procedure of example 1 is repeated, except that a section of Teflon PFA pipe is dipped into a 5% solution of vinylidene dichloride/vinyl chloride copolymer in tetrahydrofuran for 5% minutes and allowed to dry. There is obtained a Teflon PFA pipe-vinylidene dichloride/vinyl chloride copolymer composite. Following the procedure of example 1, the Teflon PFA composite is found to be less permeable to HCl as compared to the untreated tube.

What is claimed is:

1. A method for reducing the corrosive chemical vapor permeability of a polyfluoroorgano resin substrate, which method comprises applying, to the surface of the polyfluoroorgano resin substrate which is immediate to the external environment, a vinylidene dichloride copolymer to produce a polyfluoroorgano resin substrate-vinylidene dichloride copolymer composite.

2. A method in accordance with claim 1, wherein the polyfluoroorgano resin substrate is a copolymer of tetrafluoroethylene and perfluoroalkyl vinylether.

3. A method in accordance with claim 1, wherein the polyfluoroorgano resin substrate is a copolymer of tetrafluoroethylene and perfluoromethyl vinyl ether.

4. A method in accordance with claim 1, wherein the polyfluoroorgano resin substrate is a copolymer of tetrafluoroethylene and hexafluoropropylene.

5. A method in accordance with claim 1, wherein the polyfluoroorgano resin substrate is polytetrafluoroethylene.

6. A method in accordance with claim 1, wherein the vinylidene dichloride copolymer is a vinylidene dichloride/vinyl chloride copolymer.

7. A method in accordance with claim 1, wherein the polyfluoroorgano resin substrate-vinylidene dichloride copolymer composite is a tetrafluoroethyleneperfluoroalkyl vinylether copolymer pipe wrapped with a vinylidene dichloride/vinyl chloride copolymer film.

8. A method in accordance with claim 1, wherein the corrosive chemical is ammonia.

9. A method in accordance with claim 1, wherein the corrosive chemical is hydrogen chloride.

* * * * *